US006190793B1

(12) United States Patent
Barton et al.

(10) Patent No.: US 6,190,793 B1
(45) Date of Patent: Feb. 20, 2001

(54) ELECTROCHEMICAL FUEL CELL STACK WITH AN IMPROVED COMPRESSION ASSEMBLY

(75) Inventors: Russell H. Barton, New Westminster; Joel A. Ronne, Vancouver; Henry H. Voss, West Vancouver, all of (CA)

(73) Assignee: Ballard Power Systems Inc., Burnaby (CA)

( * ) Notice: Under 35 U.S.C. 154(b), the term of this patent shall be extended for 0 days.

(21) Appl. No.: 09/116,178

(22) Filed: Jul. 15, 1998

Related U.S. Application Data

(60) Provisional application No. 60/052,713, filed on Jul. 16, 1997.

(51) Int. Cl.$^7$ .................................................. H01M 8/04
(52) U.S. Cl. ............................................. 429/34; 429/37
(58) Field of Search ............................. 429/34, 37, 25, 429/159, 183; 29/623.1

(56) References Cited

U.S. PATENT DOCUMENTS

| 4,973,531 | * | 11/1990 | Zaima ........................ 429/37 |
| 5,409,787 | * | 4/1995 | Blayner ....................... 429/66 |
| 5,484,666 | * | 1/1996 | Gibb ........................... 429/34 |
| 5,686,200 | | 11/1997 | Barton et al. ................ 429/37 |
| 5,789,091 | | 8/1998 | Wozniczka et al. .......... 429/12 |

FOREIGN PATENT DOCUMENTS 0329161   8/1989  (EP) .

OTHER PUBLICATIONS

Hideo, et al., JP 63–043270, "Fuel Cell Stack Clamping Device," Publication Date: Feb. 24, 1988 (Abstract Only).

* cited by examiner

Primary Examiner—Carol Chaney
Assistant Examiner—Mark Ruthkosky
(74) Attorney, Agent, or Firm—McAndrews, Held & Malloy, Ltd.

(57) ABSTRACT

An electrochemical fuel cell stack with an improved compression assembly comprises a tension member which is electrically non-conductive and preferably non-metallic. The tension member can be made from a composite material which has similar expansion and contraction properties as the stack materials, thereby reducing undesirable fluctuations in the compressive force applied to the stack. An improved apparatus for securing the improved tension member to the rest of the compression assembly is also provided. Preferred embodiments of an improved compression assembly employ a collet and wedges to grip the tension member and compress a resilient member which imparts a tensile force to the tension member and a compressive force to the fuel cell assemblies. In other embodiments, an improved compression assembly employs a unitary resilient member and fastener in combination with a tension member. The improved apparatus is easier to assemble in high speed manufacturing processes because the compression assembly can be assembled or installed using the same machinery which is used to compress the stack in one fixturing because the compression assembly is assembled by being stacked in essentially the same direction as the other fuel cell components. An improved method of assembling a compression assembly for an electrochemical fuel cell stack is also provided.

35 Claims, 7 Drawing Sheets

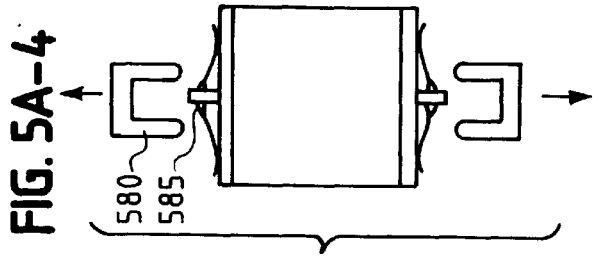
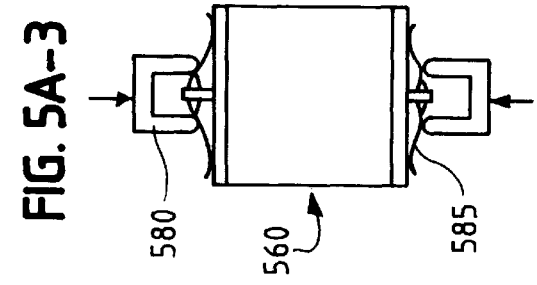
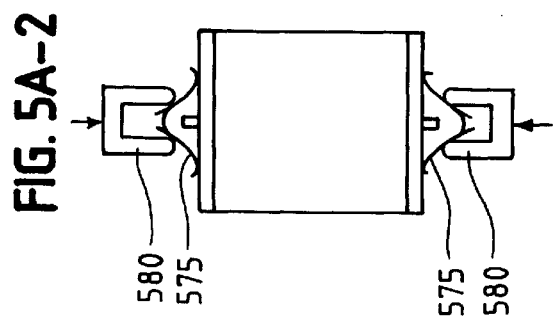
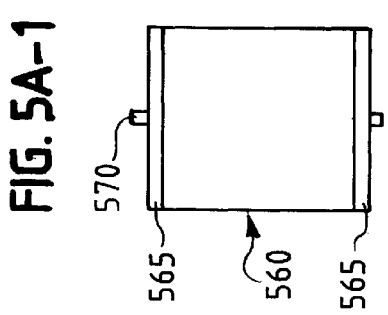
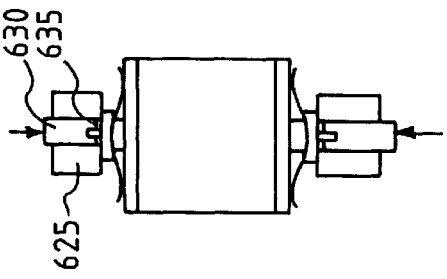
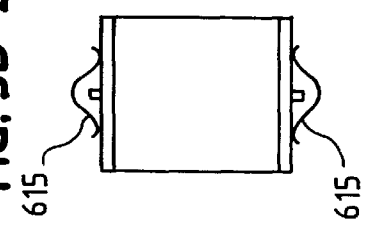
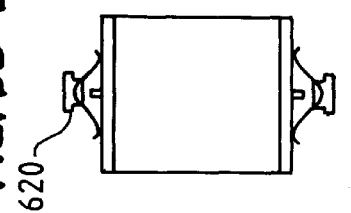
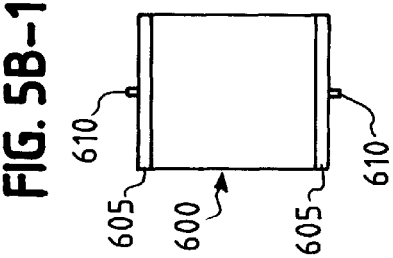

ELECTROCHEMICAL FUEL CELL STACK WITH AN IMPROVED COMPRESSION ASSEMBLY

CROSS-REFERENCE TO RELATED APPLICATION

This application relates to and claims priority benefits from U.S. Provisional Patent Application Ser. No. 60/052,713 filed Jul. 16, 1997, which is incorporated by reference herein in its entirety.

TECHNICAL FIELD

The present invention relates to electrochemical fuel cells. In particular, the invention provides a fuel cell stack with an improved compression assembly for facilitating high speed manufacturability.

BACKGROUND

Electrochemical fuel cells convert reactants, namely fuel and oxidant fluid streams, to generate electric power and reaction products. Solid polymer electrochemical fuel cells generally employ a membrane electrode assembly ("MEA") consisting of a solid polymer electrolyte or ion exchange membrane disposed between two electrode layers comprising porous, electrically conductive sheet material. An electrocatalyst is disposed at each membrane/electrode layer interface to induce the desired electrochemical reaction. The location of the electrocatalyst generally defines the electrochemically active area of the MEA.

In typical fuel cells, the MEA is disposed between two electrically conductive separator plates or fluid flow field plates. Fluid flow field plates have at least one flow passage formed therein to direct the fuel and oxidant fluid streams to the respective electrode layers, namely the anode on the fuel side and the cathode on the oxidant side. In a single cell arrangement, fluid flow field plates are provided on each of the anode and cathode sides. The plates act as current collectors and provide support for the electrodes.

Two or more fuel cells can be connected together, generally in series, but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack.

The stack typically includes inlet ports and manifolds for directing the fuel and the oxidant to the anode and cathode flow field passages respectively. The stack often also includes an inlet port and manifold for directing a coolant fluid to interior passages within the stack to absorb heat generated by the exothermic reaction in the fuel cells. The stack also generally includes exhaust manifolds and outlet ports for expelling the unreacted fuel and oxidant gases, as well as an exhaust manifold and outlet port for the coolant exhaust stream exiting the stack.

The fuel fluid stream typically comprises hydrogen. For example, the fuel fluid stream may be substantially pure hydrogen or a gas comprising gaseous hydrogen such as a reformate stream. Alternatively, a liquid fuel stream such as aqueous methanol may be used. The oxidant fluid stream which is supplied to the cathode typically comprises oxygen, such as, for example, air or another dilute oxygen stream.

It is desirable to seal reactant fluid stream passages in fuel cell stack to prevent leaks or inter-mixing of the fuel and oxidant fluid streams. Fuel cell stacks typically employ fluid tight resilient seals, such as elastomeric gaskets between the separator plates and membranes. Such seals typically circumscribe the manifolds and the electrochemically active area. Sealing is effected by applying a compressive force to the resilient gasket seals.

Fuel cell stacks are compressed to enhance sealing and electrical contact between the surfaces of the separator plates and the MEAs, and sealing between adjacent fuel cell stack components. In conventional fuel cell stacks, the fuel cell stacks are typically compressed and maintained in their assembled state between a pair of end plates by one or more metal tie rods or tension members. The tie rods typically extend through holes formed in the stack end plates, and have associated nuts or other fastening means to secure them in the stack assembly. The tie rods may be external, that is, not extending through the fuel cell plates and MEAs, however, external tie rods can add significantly to the stack weight and volume. It is generally preferable to use one or more internal tie rods which extend between the stack end plates through openings in the fuel cell plates and MEAs as described in U.S. Pat. No. 5,484,666. Typically resilient members are utilized to cooperate with the tie rods and end plates to urge the two end plates towards each other to compress the fuel cell stack.

The resilient members accommodate changes in stack length caused by, for example, thermal or pressure induced expansion and contraction, and/or deformation. That is, the resilient member expands to maintain a compressive load on the fuel cell assemblies if the thickness of the fuel cell assemblies shrinks. The resilient member may also compress to accommodate increases in the thickness of the fuel cell assemblies. Preferably, the resilient member is selected to provide a substantially uniform compressive force to the fuel cell assemblies, within an anticipated expansion and contraction limits for an operating fuel cell. The resilient member may comprise mechanical springs, or a hydraulic or pneumatic piston, or spring plates, or pressure pads, or other resilient compressive devices or mechanisms. For example, one or more spring plates may be layered in the stack. The resilient member cooperates with the tension member to urge the end plates toward each other, thereby applying a compressive load to the fuel cell assemblies and a tensile load to the tension member.

Conventional tension members typically have a mechanism for receiving a tensile load which is transferred to the tension member from the compression assembly. For example, the mechanism may be a protrusion or flange which typically bears against the resilient member or end plate to essentially prevent the end plates from moving apart. Conventionally, the ends of the tension member are threaded to receive a nut or other fastener which provides a bearing surface for receiving a tensile load. An advantage of a threaded connection is that the nut may be tightened to precisely adjust the tensile load applied to the tension member. However, there are several disadvantages of threaded connections, including the susceptibility of threaded ends to damage, the time required for assembly, and the production costs for high speed manufacturing processes. Threaded ends may be damaged, for example, by mishandling or by being stripped by the nuts during assembly (e.g. from misalignment or over-tightening). During assembly, to prevent the nuts from being over-tightened it may be necessary to monitor or limit the torque applied to the nuts.

A particular disadvantage with metallic tension members, and especially internal tension members, is that they need to be electrically insulated from the fuel cells in the stack to prevent the tension members from causing a short circuit. Metallic tension members are typically used with an electrically insulating sleeve. In addition to such sleeves being an additional component, a problem with sleeves is that repeated temperature cycles, the humid environment within the fuel cell assemblies, or other characteristics of the operating environment within the fuel cell stack may cause a sleeve to develop cracks or holes.

Still another disadvantage of metallic tension members is that they are also a potential source of metal ion contamination which can adversely affect the membrane electrolyte and/or electrocatalyst in the MEAs. For example, contamination may cause the electrocatalyst to become poisoned. Corrective action for electrocatalyst poisoning typically requires the fuel cell to be shut down. For electrocatalyst which is severely poisoned, it may be necessary to dismantle the fuel cell stack and replace the MEAs and the components which caused the contamination. Furthermore, metal ion contamination may be particularly extensive if the source of the contamination is internal tension members which extend through the interior of the fuel cell stack. Such tension members typically extend through the reactant fluid manifolds. Thus metal ions originating from a faulty metallic tension members can be transported to all of the interior fluid passages which are fluidly connected to the reactant manifold, including fluid passages leading to the electrocatalyst layer.

Accordingly, there is a need for an improved compression assembly which mitigates some or all of the aforementioned disadvantages which are associated with conventional compression assemblies which employ electrically conductive metallic tension members.

SUMMARY OF THE INVENTION

An electrochemical fuel cell stack with an improved compression assembly for high speed manufacturing processes is provided, wherein the fuel cell stack comprises:
  a first end plate;
  a second end plate;
  at least one fuel cell assembly interposed between the first and second end plates; and
  a compression assembly associated with the first and second end plates, the compression assembly comprising:
    a resilient member which urges the first end plate towards the second end plate;
    an elongate tension member with a longitudinal axis extending between the first end plate and the second end plate; and
    a restraining member which is linearly engaged with the tension member in the direction of the longitudinal axis of the tension member,
  wherein the restraining member cooperates with the tension member to transmit a tension load to the tension member from the fuel cell stack.

The resilient member preferably comprises a spring plate or leaf spring, or a plurality of leaf springs layered on top of each other. Alternatively, the resilient member may comprise another type of resilient member, known to those skilled in the art, such as a disc spring, a coil spring, or a resilient elastomer.

In a preferred embodiment the restraining member is unitary with the resilient member. The unitary restraining member is preferably a spring arm which extends from an opening in the resilient member which receives the tension member. The spring arm is deflected by the tension member when the tension member is inserted through the opening in the resilient member. The spring arm is disposed to an undeflected position; thus the deflected spring arm exerts a force onto the tension member which grips the tension member, thereby engaging the restraining member with the tension member.

Preferably the spring arm is a pair of spring arms which extend towards each other from opposite sides of the opening in the resilient member. Both first and second spring arms extend into the opening in the resilient member. The tension member is engaged between the first and second spring arms by inserting the tension member through the opening in the resilient member. To improve the grip of the restraining member on the tension member, the tension member may be provided with a textured surface.

In another preferred embodiment, the restraining member comprises a collet through which the tension member is inserted and a wedge which is inserted between the tension member and the collet. The wedge cooperates with the collet to grip the tension member. To improve the grip between the wedge and the tension member, the surfaces of the wedge and/or the surfaces of the tension member may be textured. The textured surface may comprise lateral ridges or teeth. The lateral ridges or teeth may be shaped to cooperate with each other for improved gripping. In one embodiment, the teeth may be angled to engage operate as a ratchet.

In preferred embodiments, the resilient member is located immediately between one of the first and second end plates and a restraining member. The spring can thus expand or contract in response to corresponding contraction or expansion of the fuel cell components. In other embodiments, the order in which the resilient member(s), end plates, and restraining member(s) are stacked may be changed. For example, the resilient member may be located between the end plates with the restraining member next to one of the end plates. However, a disadvantage of this embodiment is that the restraining member can not be made unitary with the resilient member and an additional plate may be required next to the resilient member to evenly distribute the compressive forces over the cross-sectional area of the stack. Alternatively, other fuel cell components may be interposed between the resilient member and the end plate or the restraining member. For example, a compression plate could be employed instead of a collet between the restraining member and the resilient member.

In particular preferred embodiments the tension member is electrically non-conductive. In some fuel cell stacks the tension members extend through openings in the fuel assemblies. An advantage of electrically non-conductive tension members is that an insulating sleeve is not required to electrically insulate it from the fuel cell assemblies.

The tension member is also preferably non-metallic. An advantage of a non-metallic tension member is that it is not a source of metal ions which may contaminate the fuel cell assemblies. The tension member may be made from a composite material, such as, for example, one which comprises a bonding agent and a plurality of reinforcing fibers. The fibers may be randomly arranged, but preferably the fibers are oriented to improve the tensile strength of the tension member. In one embodiment the composite material has a laminated structure. An example of a preferred material is pultruded fiberglass. Other electrically non-conductive fibers may be used, such as sapphire fibers or Kevlar™ fibers. Electrically conductive fibers such as carbon fibers may be used in a non-conductive matrix such as epoxy to produce an electrically non-conductive composite.

Alternatively, the tension member may comprise an electrically conductive core and an electrically insulating integral outer layer. For example, an electrically insulating coating may be bonded to the core. The coating is preferably impermeable to reactant and cooling fluids and compatible with the environment within the fuel cell stack. Coatings with such properties may be used to isolate metal cores to reduce the risk of metal ion contamination.

Also provided is an embodiment of an improved compression assembly for an electrochemical fuel cell stack comprising a resilient member which urges the first end plate towards the second end plate, a substantially electrically non-conductive tension member extending between the first end plate and the second end plate, and a restraining member which cooperates with the tension member to transmit a tension load to the tension member from the resilient member. In preferred embodiments, the tension member is non-metallic. The tension member may be a composite material such as pultruded fiberglass. Fiberglass and like composite materials also have advantageous structural characteristics. For example, pultruded fiberglass is a high strength lightweight material which is stable under tension loading. Accordingly, the weight of a fuel cell stack can be reduced by substituting fiberglass tension members for conventional metal ones. Fiberglass is also a material which is compatible and stable in a wet, acidic environment, such as the operating environment within a solid polymer fuel cell. Furthermore, because fiberglass is a composite material, component materials can be selected which have thermal expansion properties similar to the properties of the fuel cell stack. Accordingly, it is possible to make a compression assembly which will apply a consistent compressive force to a fuel cell stack without being influenced by changes in the temperature within the fuel cell stack.

A method is provided for assembling a compression assembly for an electrochemical fuel cell stack comprising at least one fuel cell assembly. This method employs wedges and comprises the steps of:

(a) extending a longitudinal axis of a tension member through a first end plate and a second end plate of the fuel cell stack;

(b) placing a resilient member over an end of the tension member, such that a through opening in the resilient member receives the end of the tension member;

(c) applying an external compressive force to the fuel cell stack in a direction parallel to the longitudinal axis; and (d) employing the external compressive force to insert at least one wedge into a gap between the tension member and the resilient member until the resilient member is compressed and in equilibrium with the compressive force.

After the external compressive force is removed, the resilient member provides a force to hold the fuel cell assemblies in compression for compressing fluid seals and pressing the stack components together for improved electrical and thermal conductivity.

To limit movement of the resilient member along the contact surface of the wedge, the wedge may employ a flange which has a depth greater than the largest gap distance between the tension member and the resilient member.

Another preferred method is provided for assembling a compression assembly for an electrochemical fuel cell stack comprising at least one fuel cell assembly. This method employs collets and wedges and comprises the following steps:

(a) extending a longitudinal axis of a tension member through an opening in a first end plate and an opening in a second end plate of the fuel cell stack;

(b) placing a resilient member over an end of the tension member, such that a through opening in the resilient member receives the end of the tension member;

(c) placing a collet over an end of the tension member and extending the tension member through the collet;

(d) applying a compressive force to the fuel cell stack in a direction parallel to the longitudinal axis; and (e) employing the compressive force to insert at least one wedge into a gap between the tension member and the collet until the resilient member is compressed and in equilibrium with the compressive force.

The wedge preferably has a textured surface for gripping the tension member. According to this method, the wedge is inserted between the collet and the tension member instead of between the spring plate and tension member. Preferably the resilient member provides an opening which is sized to receive the collet. The collet provides a through opening which is large enough to accommodate the tension member and the narrow end of the wedge. The resilient member does serve as part of the restraining member. Accordingly, in one embodiment, the resilient member may be located apart from the collet (e.g. within the fuel cell stack). In this embodiment, the collet may bear against one of the end plates with the wedge inserted into the gap between the collet and the tension member.

Another embodiment of the method of assembling a compression assembly for an electrochemical fuel cell stack comprising at least one fuel cell assembly comprises a unitary resilient member and restraining member. This method comprises the following steps:

(a) extending a longitudinal axis of a tension member through a first end plate and a second end plate of the fuel cell stack;

(b) inserting an end of the tension member through an opening in the resilient member and engaging the tension member with the resilient member by deflecting spring arms which are unitary with the resilient member; and (c) applying a compressive force to the fuel cell stack in a direction parallel to the longitudinal axis, wherein the compressive force compresses the resilient member until it is in equilibrium with the compressive force.

In all of the described methods, the resilient member is preferably a spring plate or a plurality of stacked spring plates. However, the resilient member may also another type of resilient member, such as a disc spring or a plurality of disc springs.

Any of the above described methods may further comprise employing a second compression assembly wherein both first and second compression assemblies are assembled according to the same steps. Each one of the first and second compression assemblies is associated with an opposite end of the elongate tension member. Similarly, a plurality of tension members may be simultaneously engaged with respective compression assemblies. The preferred number of tension members and compression assemblies is dependent upon the size of the fuel cell stack.

To further improve the grip between the restraining member and the tension member in any of the above embodiments of the improved compression assembly, an adhesive may be applied to surfaces of one or both of the restraining member and the tension member.

In all of the embodiments of the method, the restraining member is installed employing a compressive force in the same direction in which a compressive force is used to compress the fuel stack during the assembly process. That is, the disclosed restraining members are positioned and linearly engaged with the tension member in response to an applied linear force. The linear force is applied in a direction parallel to the longitudinal axis of the tension member. For example, for an embodiment comprising a resilient member with an integral restraining member comprising a pair of opposing spring arms, the resilient member is positioned on the tension member by a linear compressive force, and the integral restraining member is linearly engaged with the tension member by the deflection of spring arms. The spring arms are deflected in response to the linear insertion of the tension member between the opposing the spring arms which is caused by the linear compressive force. Similarly, for an embodiment of the restraining member which comprises wedges, the restraining member is linearly engaged in response to a linear compressive force which inserts the wedges into a gap between the tension member and another component such as a collet or the face of a resilient member. The linear force which inserts the wedges into the gap causes the wedges grip the tension member, thereby linearly engaging the restraining member with the tension member. The clamping forces applied by the restraining member to the tension member prevent the restraining member from releasing its grip on the tension member after the external compressive force is removed. That is, after the external compressive force is removed, the restraining member maintains a fixed position relative to the tension member. Thus the restraining member transmits loads between the fuel cell stack and the tension member, keeping the resilient member in compression and the tension member in tension.

Linear engagement of the restraining member is an advantage over known restraining members and methods of installing them. For example, tie rods and nuts require separate steps and machinery to apply a linear force to compress the fuel cell stack, and a rotational force to tighten the nuts to the desired torque.

BRIEF DESCRIPTION OF THE DRAWINGS

The advantages, nature and additional features of the invention will become more apparent from the following description, together with the accompanying drawings of embodiments of the invention, in which:

FIGS. 5A–5B schematically illustrate the sequential steps which comprise two embodiments of the method of the invention.

DETAILED DESCRIPTION OF THE PREFERRED EMBODIMENTS

Figure 1:
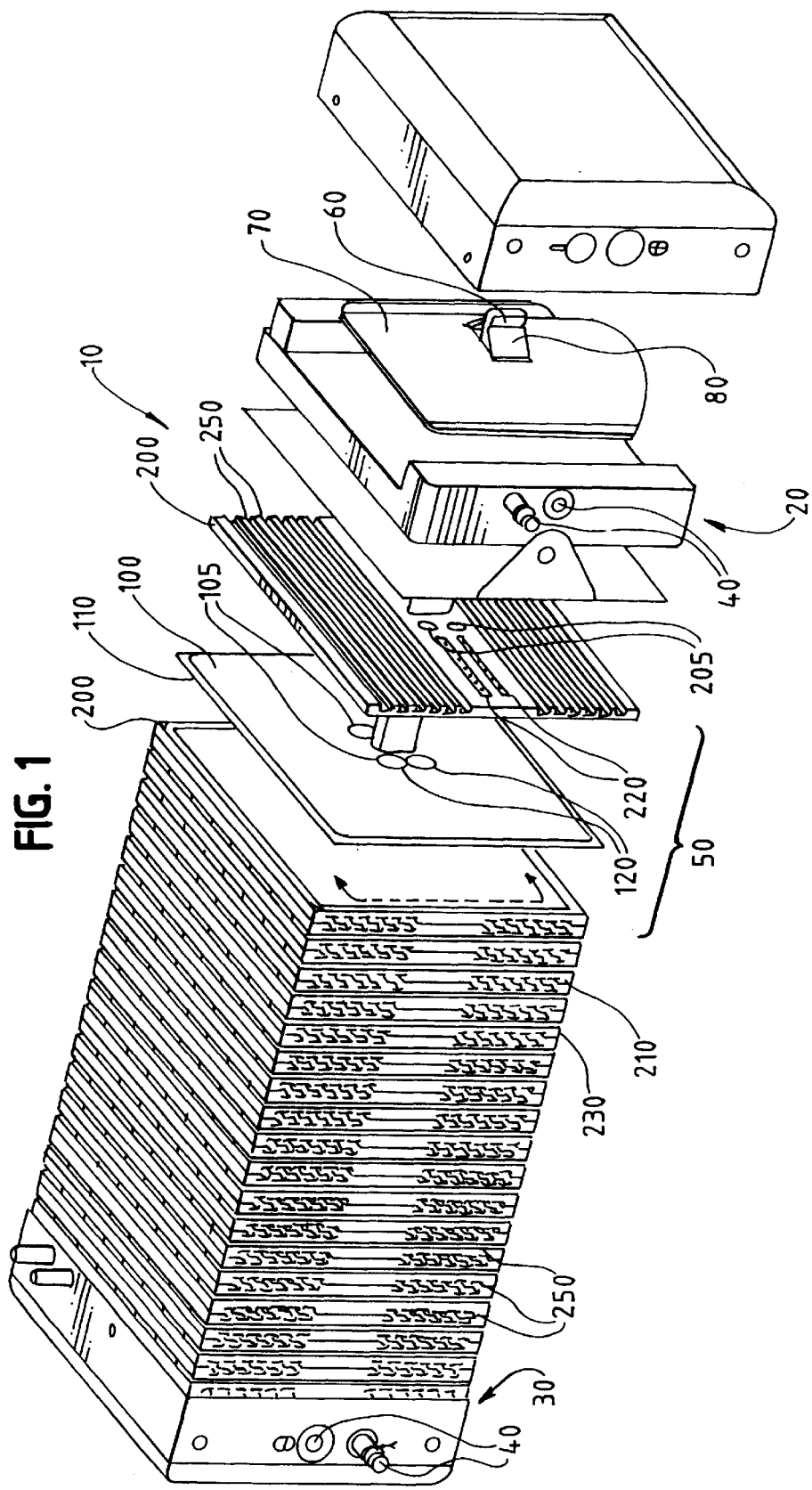
FIG. 1 is a partially exploded perspective view of an electrochemical solid polymer fuel cell stack with a compression assembly comprising a tension member and a spring plate acting as a unitary resilient restraining member and spring arms.

FIG. 1 illustrates a solid polymer electrochemical fuel cell stack 10, including a pair of end plate assemblies 20 and 30, and a plurality of stacked fuel cell assemblies 50, each comprising an MEA 100, and a pair of flow field plates 200. An elongate tension member 60 extends between and through end plate assemblies 20 and 30 to retain and secure stack 10 in its assembled state. Tension member 60 is preferably rigid and electrically non-conductive. Spring plate 70 with integral spring arms 80 grip each end of tension member 60 to apply a compressive force to fuel cell assemblies 50 of stack 10 and act as restraining members.

Fluid reactant streams are supplied to and exhausted from internal manifolds and passages in stack 10 via inlet and outlet ports 40 in end plate assemblies 20 and 30. Aligned openings 105 and 205 in MEAs 100 and flow field plates 200, respectively, form reactant manifolds extending through stack 10.

In the illustrated embodiment, perimeter seal 110 is provided around the outer edge of MEA 100. Manifold seals 120 circumscribe manifold openings 105. When stack 10 is secured in its assembled, compressed state, seals 110 and 120 cooperate with the adjacent pair of plates 200 to fluidly isolate fuel and oxidant reactant streams in internal reactant manifolds and passages, thereby isolating one reactant stream from the other and preventing the reactant streams from leaking from stack 10.

As illustrated in FIG. 1, each MEA 100 is positioned between the active surfaces of two flow field plates 200. Each flow field plate 200 has flow field channels 210 on the active surface thereof (which contacts the MEA) for distributing fuel or oxidant fluid streams to the active area of the MEA 100. In the embodiment illustrated in FIG. 1, flow field channels 210 are fluidly connected to manifold openings 205 in plate 200 via supply/exhaust channels 220 (partially shown) located on the non-active surface of flow field plate 200 and ports 230 extending through plate 200.

In the illustrated embodiment, flow field plates 200 have a plurality of open-faced parallel channels 250 formed in the non-active surface thereof. Channels 250 on adjacent pairs of plates 200 cooperate to form passages extending through stack 10, through which a coolant stream, such as air, may be directed.

In preferred embodiments, tension member 60 is made from a rigid non-metallic (preferably non-electrically conductive) material. Tension member 60 must be strong along its longitudinal axis but it need not be as strong in the lateral direction since tension member 60 is protected from lateral forces by being located internally inside fuel cell stack 10. Pultruded fiberglass is an example of a suitable material for tension member 60. In FIG. 1, tension member 60 has a generally rectangular cross section with rounded corners. Tension member 60 can be fabricated with any cross-sectional shape. A rectangular shape, however, provides a wide flat surface for contacting clamping mechanism 80 which is part of spring plate 70.

In the embodiment depicted in FIG. 1, spring plate 70 is a bowed metal plate. Integral spring arms 80 comprise metal tabs or flaps flanking a central opening hole in spring plate 70. The tabs are angled away from the crest of bowed spring plate 70. In the preferred embodiment, for one tension member 60, two spring plates 70 with integral spring arms 80 are preferably used, one on each end of tension member 60 to exert a uniform compressive force on assembled fuel cell stack 10. Spring plate 70 is adapted to fit over tension member 60. Clamping mechanism 80 allows spring plate 70 to easily slide down tension member 60 in one direction, while resisting movement in the other direction. This type of integral spring plate 70 and clamping mechanism 80 facilitates assembly of fuel cell stack 10. An external compressive force is applied to fuel cell stack 10 through spring plate 70.

During assembly an external compressive force is applied to push spring plate 70 down tension member 60 until a predetermined compressive force is applied to fuel cell assemblies 50 of stack 10. The external compressive force is released and spring plate 70 maintains a compressive loading on fuel cell stack 10. Integral spring arms 80 prevent the compressive force from being released by holding spring plate 70 in position.

Figure 2:
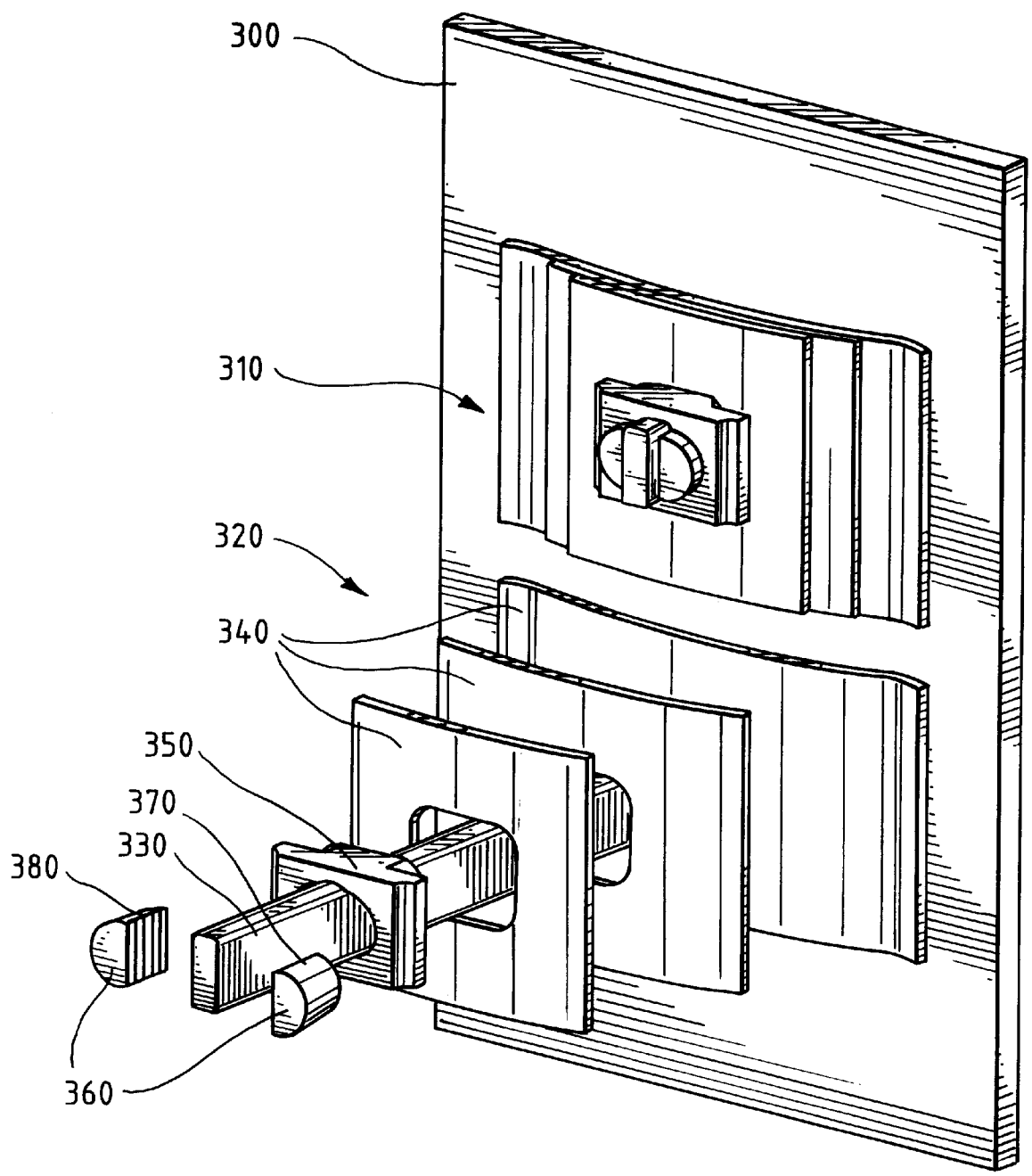
FIG. 2 is partially exploded perspective view of an end plate, tension member, and a compression assembly comprising a collet and wedges.

FIG. 2 shows an end plate 300 of a fuel cell stack (not shown) which employs two compression assemblies 310, 320. The preferred number and configuration of the compression assemblies depends upon the size and shape of the stack components. Compression assembly 310 is shown in an assembled state and compression assembly 320 is shown in exploded view. With reference to compression assembly 320, tension member 330 protrudes through an opening in end plate 300 and extends through a series of spring plates or leaf springs 340 and collet 350. In the illustrated embodiment, the compression assemblies 310 and 320 each employ three spring plates 340 as a resilient member. Tension member 330 is shown as a flat bar with a generally rectangular cross-section with beveled corners. Spring plates 340 provide a resilient compressive force to the fuel cell stack by cooperating with rigid tension member 330 and the restraining member which compress spring plates 340 against end plate 300.

As shown in FIG. 2, wedges 360 have substantially flat contact surfaces which cooperate with opposing flat surfaces of tension member 330. The illustrated wedges 360 employ ridges or teeth 370 to improve the grip on tension member 330. The outward facing surface of wedges 360 are conical and convex to cooperate with the conical and concave shape of the opening in collet 350 which receives wedges 360. The shape of the contact surfaces of wedges 360 may be different depending upon the shape of the cooperating surfaces of tension member 330 and the shape of the opening in collet 350. For example, if tension member 330 is a cylindrical bar, wedges 360 may have contact surfaces which are concave to cooperate with the cylindrical shape of tension member 330.

The thin edge of wedge 360 is the leading edge 380 which is pushed into the gap between tension member 330 and collet 350. The thick ends of wedges 360 are the ends which are visible in the assembled compression assembly 310.

In the preferred embodiment, the receiving surface of the collet opening is tapered to the same angle as wedges 360 to increase the contact area between wedges 360 and tension member 330 and collet 350. In the preferred embodiment, collet 350 and wedges 360 are shaped and sized so that tension member 330 is tightly gripped between wedges 360 when wedges 360 protrude slightly from the face of collet 350.

Figure 3A:
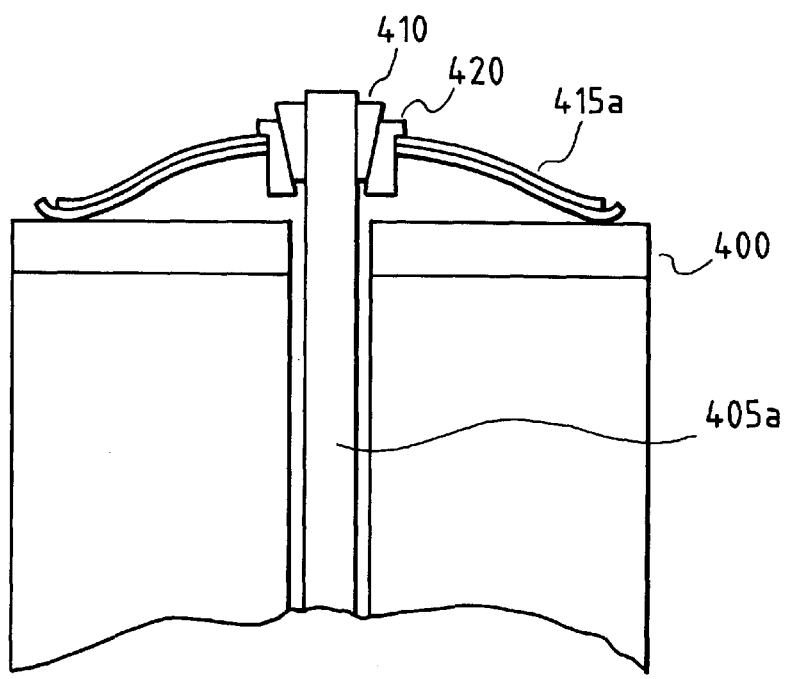
FIGS. 3A–3F are partial section views of six embodiments of a compression assembly.

FIG. 3A is a partial section view of a fuel cell stack illustrating a preferred embodiment of a compression assembly (similar to the compression assembly of FIG. 2). FIG. 3a shows an end plate 400a, with an end of a tension member 405a extending therethrough with wedges 410 gripping tension member 405a. Collet 420 is seated in an opening in spring plate 415a. The opening in collet 420 is larger than the thickness of tension member 405a so that a gap is provided for receiving wedges 410. The interior surface of collet 420 are preferably angled in relation to the opposing surfaces of tension member 405a to provide a larger contact surface between wedge 410 and collet 420.

Figure 3B:
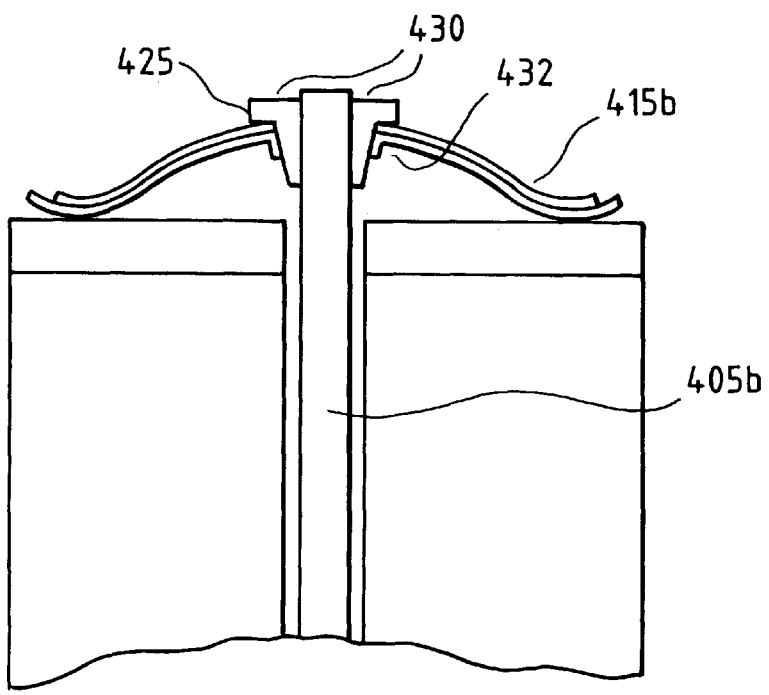

FIG. 3B illustrates an alternative embodiment which does not employ a collet.

Tension member 405b is gripped between wedges 430. Wedges 430 engage tension member 405b and spring plates 415b directly. Wedges 410 may have unitary flanges 425 for providing an enlarged contact surface with spring plates 415b. Flanges 425 may also ensure that wedges 430 are not pushed entirely through the opening in spring plate 415b. Edges 432 of the spring plate opening may optionally be folded down at an angle which cooperates with the angled surface of wedge.

Figure 3C:
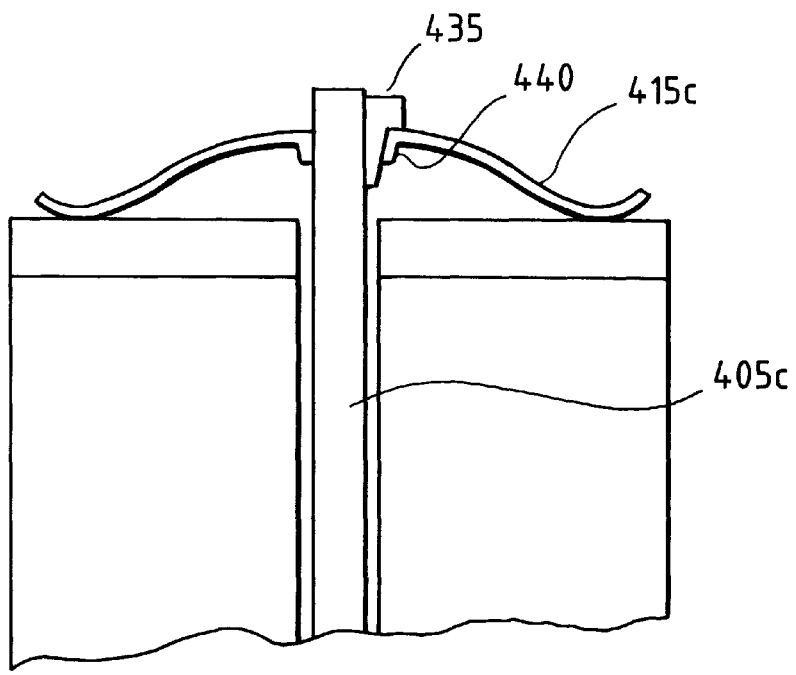

FIG. 3C depicts an embodiment of a compression assembly which employs only one wedge 435. Spring plate 415c has an opening for receiving tension member 405c and wedge 435. Spring plate 415c has folded edges 440 facing the contacting surface of tension member 405c. Folded edges 440 provide a larger surface for engaging tension member 405c and wedge 435.

Figure 3D:
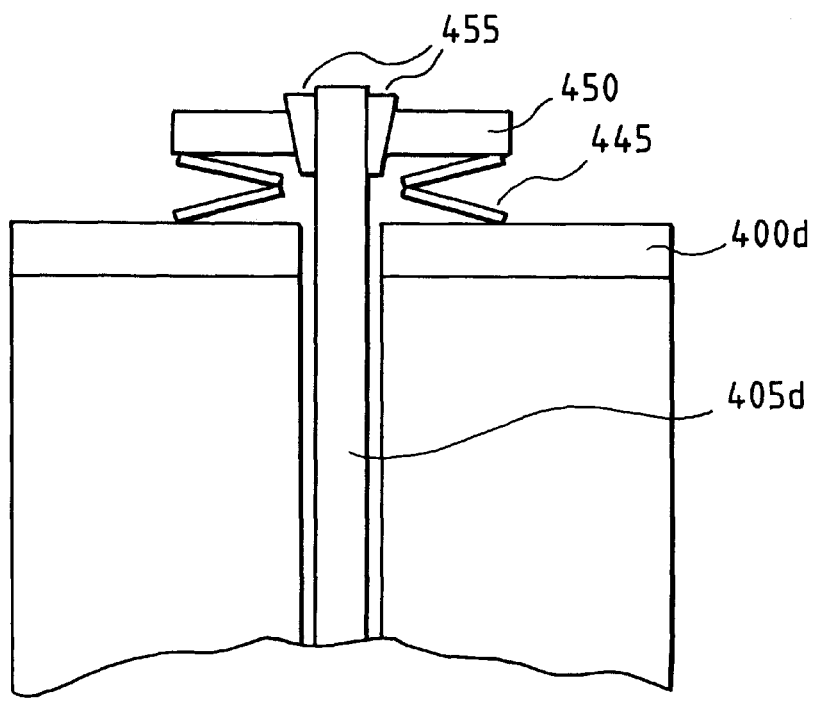

FIG. 3D shows an embodiment of a compression assembly which uses disc springs 445 instead of spring plates. Disc springs 445 are compressed between collet 450 and end plate 400d. Wedges 455 are pushed into contact with tension member 405d and collet 450 to grip tension member 455 and to prevent collet 450 from sliding off the end of tension member 405d. In alternative embodiments of this arrangement, coil springs or a resilient elastomer could be substituted for disc springs 445.

Figure 3E:
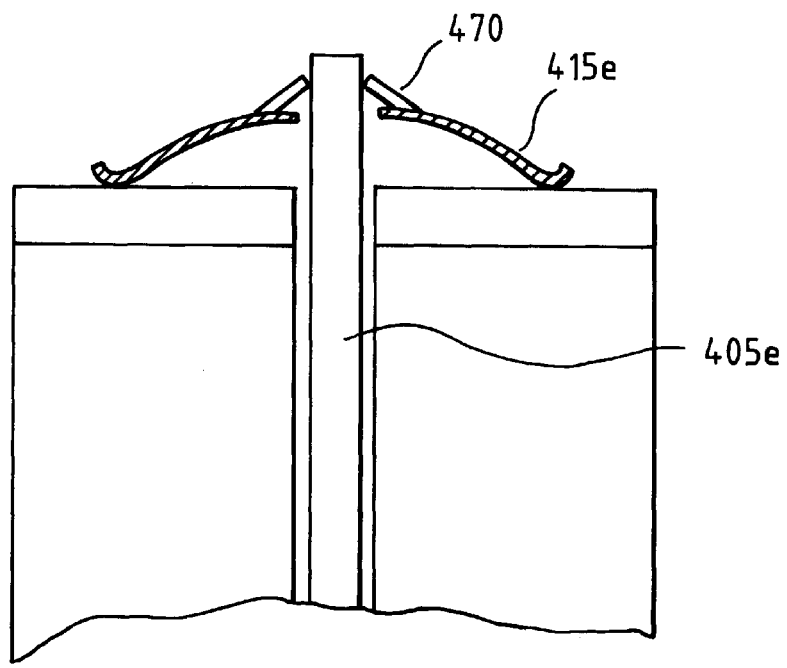

FIG. 3E shows another preferred embodiment of a compression assembly (similar to that shown in FIG. 1). Spring plate 415e has unitary spring arms 470 which are disposed toward an undeflected position. When spring arms 470 are deflected as they are in FIG. 3E, they apply a clamping force to grip tension member 405e.

Figure 3F:
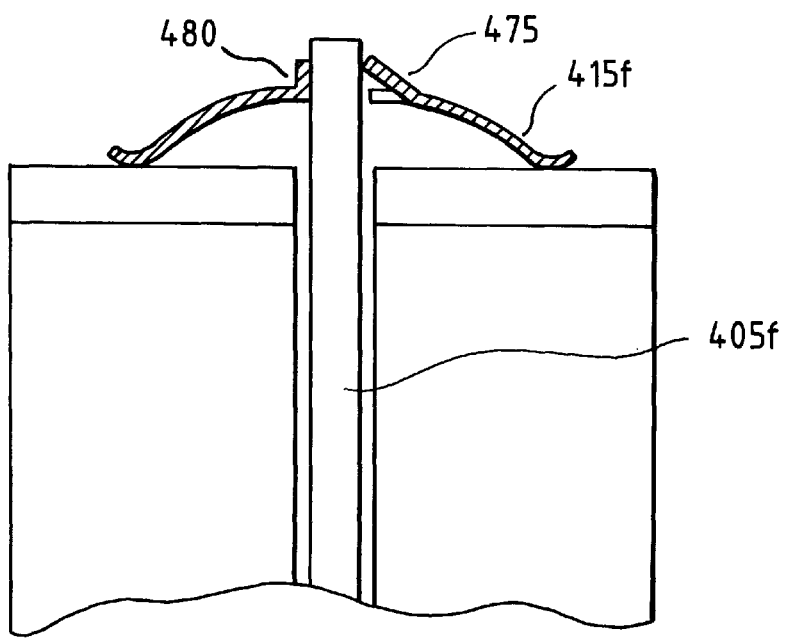

FIG. 3F illustrates how a single spring arm 475 may be used to grip tension member 405f. Edge 480 of spring plate 415f is optionally bent to provide a larger surface for bearing against tension member 405f. Tension member 405f is pressed into contact with edge 480 by deflected spring arm 475.

Figure 4A:
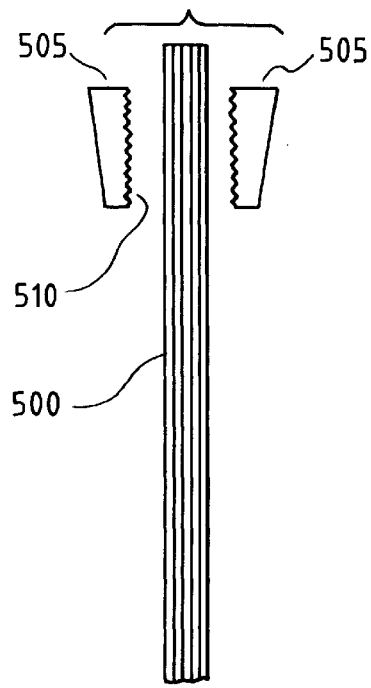
FIGS. 4A–4D depict four embodiments of tension members and associated wedges.

FIG. 4A is a side view of the end of a laminated tension member 500 and two wedges 505. Laminated tension member 500 has opposing flat surfaces for contacting the adjacent substantially flat surfaces of wedges 505. In the embodiment illustrated by FIG. 4A, wedges 505 have teeth 510 on the contact surfaces which grip tension member 500.

Figure 4B:
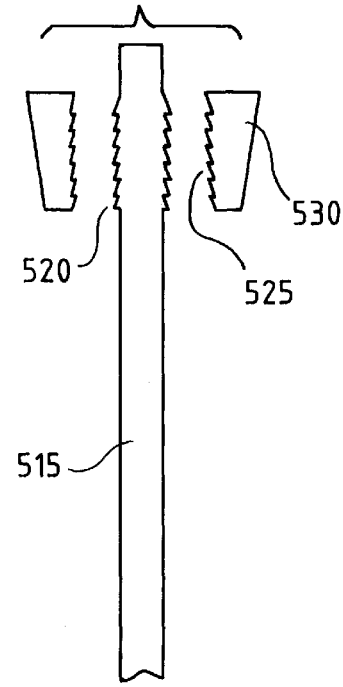

FIG. 4B is a side view of a tension member 515 which has ridges 520 which protrude from the flat surface of tension member 515. Ridges 520 are angled to receive interlocking ridges 525 on wedges 530. The ridges are angled to operate in a ratcheting fashion which facilitates installation of wedges 530, while resisting the removal of same.

Figure 4C:
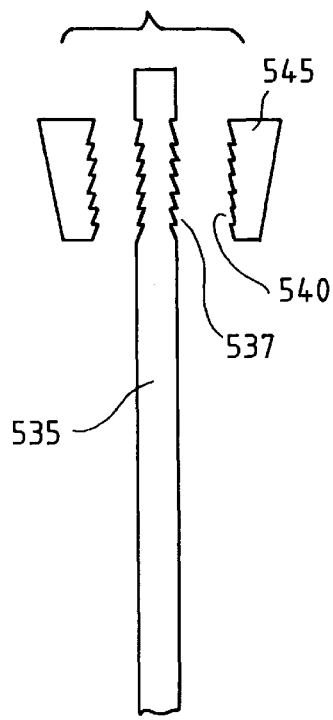

FIG. 4C is a side view of tension member 535 similar to tension member 515, except that instead of protruding ridges 520, tension member 535 employs grooves or recesses which cooperate with the angled ridges 540 of wedges 545.

Figure 4D:
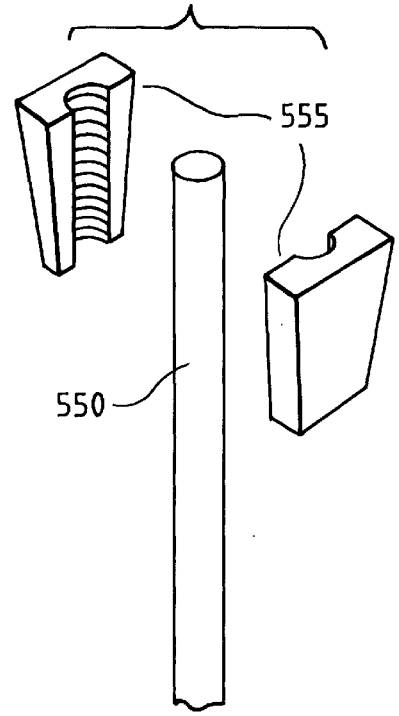

FIG. 4D is a perspective view of the end of a cylindrical tension member 550 with two wedges 555. Wedges 555 have a concave surfaces which cooperate with the cylindrical exterior surface of tension member 550 to grip tension member 550 therebetween.

With reference to FIGS. 5A and 5B, embodiments of the method are illustrated by diagrams which depict sequential steps for two methods of assembling a fuel cell stack using an improved compression assembly as disclosed by the present invention. In particular, FIGS. 5A and 5B illustrate method comprising the steps of:

(a) extending a longitudinal axis of a tension member through a first end plate and a second end plate of the fuel cell stack; and (b) applying a compressive force to the fuel cell stack in a direction parallel to the longitudinal axis, wherein the compressive force linearly engages a restraining member with the tension member, and compresses a resilient member until it is in equilibrium with the compressive force.

In FIG. 5A, diagram I depicts a fuel cell stack 560 comprising fuel cell assemblies interposed between end plates 565. At this stage, fuel cell stack 560 has not been compressed, but internal tension member 570 has been inserted through an opening which extends through the interior of fuel cell stack 560 and end plates 565. The opposite ends of tension member 570 protrude from end plates 565. Diagram II depicts spring plates 575 positioned next to each end plate with an external compression device 580 bearing against spring plates 575. Diagram III depicts fuel cell stack 560 after being compressed by a linear compressive force applied in the direction of the longitudinal axis of tension member 570 (as indicated by the arrows). The magnitude of compression illustrated by Diagram III is exaggerated for illustrative purposes. Diagram III shows how spring plates 575 have been deflected and spring arms 585 have engaged tension member 570. Diagram IV depicts the removal of external compression device 580. Spring arms 585 are unitary with spring plate 575. The linear compressive force linearly engages spring arms 585 which are deflected in response to the insertion of tension member 570 between spring arms 585, which is caused by the linear compressive force.

With reference now to FIG. 5B, diagram I depicts a fuel cell stack 600 comprising fuel cell assemblies interposed between end plates 605. At this stage fuel cell stack 600 is not compressed, but internal tension member 610 has been inserted through an opening which extends through the interior of fuel cell stack 600 and end plates 605. The opposite ends of tension member 610 protrude from end plates 605. Diagram II depicts spring plates 615 positioned next to each end plate. In diagram III collets 620 have been inserted into openings provided in spring plates 615. Flanges on collets 620 are seated against spring plates 615. An opening in collet 620 is aligned with tension member 610. In the step illustrated by diagram IV, an external compressive device 625 pushes against the compression assembly in the longitudinal direction of the tension member (as indicated by arrows in Diagram IV). External compressive device 625 compresses fuel cell stack 600, causing tension member 610 to protrude through collets 620. With reference to diagram V, once fuel cell stack 600 is compressed, member 630 of external compression device 625 continues to apply a linear compressive force in the longitudinal direction of the tension member to insert wedges 635 into respective gaps between collet 620 and tension member 610. Wedges 635 are inserted until they fill the available gaps such that linear forces cause the wedge surfaces in contact with tension member 610 to grip onto tension member 610, thereby linearly engaging the compression assembly with tension member 610. Once the compression assembly is positioned so that the external compressive force and resilient member 615 are in equilibrium, external compression device 625 can be removed. Diagram V depicts fuel cell stack 600 after being compressed with only the thick ends of wedges 635 protruding from collet 620. Diagram V also shows how spring plates 615 have been deflected. The steps depicted by diagrams IV and V have been separated for illustrative purposes. Alternatively, external compression device 625 could designed to combine these steps such that the application of one external compressive force compresses stack 600 and resilient member 615 while also positioning and engaging wedges 635.

As will be apparent to those skilled in the art in the light of the foregoing disclosure, many alterations and modifications are possible in the practice of this invention without departing from the spirit or scope thereof Accordingly, the scope of the invention is to be construed in accordance with the substance defined by the following claims.

What is claimed is:

1. An electrochemical fuel cell stack comprising:
   a first end plater;
   a second end plater;
   a fuel cell assembly interposed between said first and second end plates; and
   a compression assembly associated with said first and second end plates, said compression assembly comprising:
      a resilient member which urges said first end plate towards said second end plate;
      an elongate tension member, with a longitudinal axis, extending between said first end plate and said second end plate; and
      a restraining member which is engaged with said tension member in the direction of said longitudinal axis of said tension member, wherein said restraining member cooperates with said tension member to transmit a tension load to said tension member from said fuel cell stack, wherein said restraining member is unitary with said resilient member, and wherein said restraining member comprises a spring arm extending from and unitary with said resilient member which is deflectable to engage said tension member.

2. The electrochemical fuel cell stack of claim 1, wherein said restraining member comprises a pair of spring arms which extend towards each other, and said first and second spring arms are engaged with said tension member by inserting said tension member therebetween.

3. The electrochemical fuel cell stack of claim 2 wherein tension member has a textured surface for improving gripping between contact surfaces of said spring arms and said tension member.

4. An electrochemical fuel cell stack comprising:
   a first end plate;
   a second end plate;
   a fuel cell assembly interposed between said first and second end plates; and
   a compression assembly associated with said first and second end plates, said compression assembly comprising:
      a resilient member which urges said first end plate towards said second end plate;
      an elongate tension member, with a longitudinal axis, extending between said first end plate and said second end plate; and
      a restraining member which is engaged with said tension member in the direction of said longitudinal axis of said tension member, wherein said restraining member cooperates with said tension member to transmit a tension load to said tension member from said fuel cell stack and wherein said restraining member comprises a collet through which said tension member is inserted and a wedge inserted between said tension member and said collet, said wedge cooperating with said collet to grip said tension member.

5. The electrochemical fuel cell stack of claim 4 wherein a surface of said wedge is textured for improving said grip between said tension member and said wedge.

6. The electrochemical fuel cell stack of claim 5 wherein said textured surface comprises lateral ridges or teeth.

7. The electrochemical fuel cell stack of claim 4 wherein a surface of said tension member, which contacts said wedge, is textured for improving said grip between said tension member and said wedge.

8. The electrochemical fuel cell stack of claim 4 wherein opposing surfaces of said wedge and said tension member each have lateral ridges or teeth which cooperate with each other for improved gripping.

9. The electrochemical fuel cell stack of claim 8 wherein said lateral ridges or teeth interlock and operate as a ratchet.

10. The electrochemical fuel cell stack of claim 3 wherein said resilient member is a spring plate or a leaf spring.

11. The electrochemical fuel cell stack of claim 3 wherein said resilient member is a resilient elastomer.

12. The electrochemical fuel cell stack of claim 3 wherein said tension member is electrically non-conductive.

13. The electrochemical fuel cell stack of claim 6 wherein said tension member is nonmetallic.

14. The electrochemical fuel cell stack of claim 13 wherein said tension member is made from a composite material.

15. The electrochemical fuel cell stack of claim 14 wherein said composite material is pultruded fiberglass.

16. The electrochemical fuel cell stack of claim 14 wherein said composite material is laminated.

17. The electrochemical fuel cell stack of claim 12 wherein said tension member comprises an electrically conductive core and an electrically insulating outer layer.

18. The electrochemical fuel cell stack of claim 17 wherein said electrically insulating layer is a coating which is bonded to said core.

19. The electrochemical fuel cell stack of claim 17 wherein said electrically conductive core is a metal bar or rod.

20. A method of assembling a compression assembly for an electrochemical fuel cell stack comprising at least one fuel cell assembly interposed between a first end plate and a second end plate, said method comprising the steps of:
   (a) extending a longitudinal axis of a tension member through a first end plate and a second end plate of said fuel cell stack;
   (b) applying a compressive force to said fuel cell stack in a direction parallel to said longitudinal axis, wherein said compressive force engages a restraining member with said tension member, and compresses a resilient member until it is in equilibrium with said compressive force; and
   (c) placing a resilient member over an end of said tension member, such that a through opening in said resilient member receives said end of said tension member, and
the step of engaging said restraining member comprises employing said compressive force to insert at least one wedge into a gap between said tension member and said resilient member.

21. The method of claim 20 wherein said resilient member is a spring plate.

22. The method of claim 21 wherein said spring plate is a plurality of spring plates.

23. The method of claim 20 wherein said wedge has a flange which limits movement of said resilient member along the surface of said wedge.

24. The method of claim 20 wherein said resilient member is a disc spring.

25. The method of claim 20 further comprising the step of applying an adhesive between said wedge and said tension member.

26. The method of claim 20 further comprising a second compression assembly which is assembled according to said steps in claim 20 wherein said two compression assemblies are each associated with an opposite end of said tension member.

27. A method of assembling a compression assembly for an electrochemical fuel cell stack comprising at least one fuel cell assembly interposed between a first end plate and a second end plate, said method comprising the steps of:
   (a) extending a longitudinal axis of a tension member through a first end plate and a second end plate of said fuel cell stack;
   (b) applying a compressive force to said fuel cell stack in a direction parallel to said longitudinal axis, wherein said compressive force engages a restraining member with said tension member, and compresses a resilient member until it is in equilibrium with said compressive force; and
   (c) placing a resilient member over an end of said tension member, such that a through opening in said resilient member receives said end of said tension member;
   (d) placing a collet over an end of said tension member and extending said tension member through said collet; and
the step of engaging said restraining member comprises employing said compressive force to insert at least one wedge into a gap between said tension member and said collet until said resilient member is compressed and in equilibrium with said compressive force.

28. The method of claim 27 wherein said resilient member is a spring plate.

29. The method of claim 28 wherein said spring plate is a plurality of spring plates.

30. The method of claim 27 wherein said resilient member is a disc spring.

31. The method of claim 27 wherein said wedge has a textured surface for gripping said tension member.

32. The method of claim 27 further comprising a second compression assembly which is assembled according to said steps in claim 26 wherein said two compression assemblies are each associated with an opposite end of said tension member.

33. A method of assembling a compression assembly for an electrochemical fuel cell stack comprising at least one fuel cell assembly interposed between a first end plate and a second end plate, said method comprising the steps of:
   (a) extending a longitudinal axis of a tension member through a first end plate and a second end plate of said fuel cell stack;
   (b) applying a compressive force to said fuel cell stack in a direction parallel to said longitudinal axis, wherein said compressive force engages a restraining member with said tension member, and compresses a resilient member until it is in equilibrium with said compressive force; and
the step of engaging said restraining member comprises inserting an end of said tension member through an opening in said resilient member and engaging said tension member through an opening in said resilient member and engaging said tension member with said resilient member by deflecting spring arms which are unitary with said resilient member.

34. The method of claim 33 wherein said resilient member is a spring plate.

35. The method of claim 33 further comprising a second compression assembly which is assembled according to the same steps as the compression assembly of claim 44 wherein said two compression assemblies are each associated with an opposite end of said tension member.

* * * * *

UNITED STATES PATENT AND TRADEMARK OFFICE
CERTIFICATE OF CORRECTION

PATENT NO. : 6,190,793 B1  
DATED : February 20, 2001  
INVENTOR(S) : Russell H. Barton, Joel A. Ronne and Henry H. Voss It is certified that error appears in the above-identified patent and that said Letters Patent is hereby corrected as shown below:

<u>Column 12,</u>
Lines 11 and 12, the word "plater" should read -- plate --.

Signed and Sealed this

Seventh Day of May, 2002

*Attest:*

JAMES E. ROGAN
*Director of the United States Patent and Trademark Office*

*Attesting Officer*